United States Patent
Hyvarinen

[15] 3,697,156
[45] Oct. 10, 1972

[54] COSMETIC MIRROR

[72] Inventor: Kauko Juhani Hyvarinen, Joensuu, Finland

[73] Assignee: Niplex International Establishment, Vaduz, Liechtenstein

[22] Filed: Dec. 28, 1970

[21] Appl. No.: 102,002

[30] Foreign Application Priority Data
Dec. 30, 1969    Switzerland............19459/69

[52] U.S. Cl....................................350/298, 287/96
[51] Int. Cl...............................................G02b 7/18
[58] Field of Search......350/298, 296, 288; 351/118, 351/50, 41, 158; 287/93, 96, 97

[56] References Cited
UNITED STATES PATENTS 2,606,479   8/1952   Howe.......................350/298

FOREIGN PATENTS OR APPLICATIONS 1,943,315   5/1970   Germany...................350/298
892,534    10/1953   Germany.....................287/97
802,839    10/1958   Great Britain.............351/118
405,521    2/1934    Great Britain.............350/298

Primary Examiner—David Schonberg
Assistant Examiner—John W. Leonard
Attorney—Waters, Roditi, Schwartz & Nissen

[57] ABSTRACT

A cosmetic mirror comprises a frame worn on the face of a user in a manner similar to a pair of eyeglasses but with only the top rim thereof, the nose support and the arms. A mirror is supported in front of the frame for pivotal movement in horizontal and vertical directions by means of a connecting parallelogram linkage which frictionally holds the mirror in adjusted position so that the user can view his reflection in the mirror.

2 Claims, 4 Drawing Figures

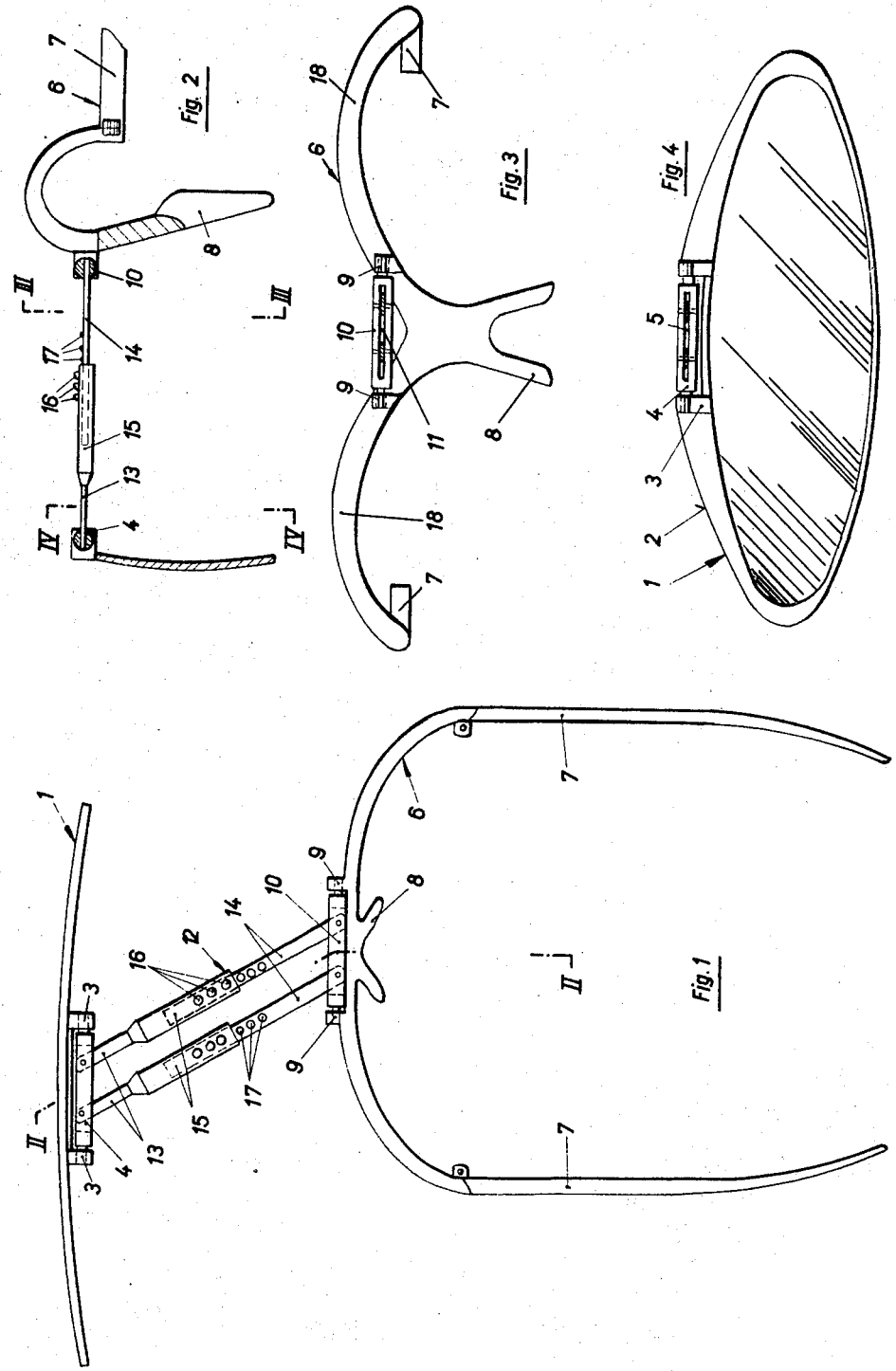

COSMETIC MIRROR

BRIEF SUMMARY OF THE INVENTION

The present invention relates to a cosmetic mirror with a frame sililar to the frame of eyeglasses and with a mirror arranged in front of the frame.

An object of the invention is to provide a cosmetic mirror which may be worn in the same manner as a pair of glasses and which is adjustable in all directions in relation to the frame, so that it can be used for the purpose of application of facial makeup or hair styling. The mirror may also be used for viewing the back of one's head in a wall mirror.

The above object is achieved, according to the invention, by providing two rollers, one above the nose support of the frame, and the second in the middle of the upper edge of the mirror, the rollers extending perpendicularly to the plane of symmetry of the frame, and being supported in corresponding bearings in the frame and in the mirror respectively. The rollers are held in position by static friction. These rollers provide at least two pivot axes which are parallel and spaced from each other and the two pivot axes are connected by a rod arrangement to provide a parallellogram mechanism linkage in which the pivotal movement of the rods is resisted by static friction. The static friction between the rollers and their bearings, as well as the static friction between the rods and their pivotal connections with the rollers, provide a stationary position for the mirror in relation to the frame.

BRIEF DESCRIPTION OF THE DRAWING

FIG. 1 is a top plan view of the cosmetic mirror arrangement,

FIG. 2 a cross section taken along the line II—II in FIG. 1,

FIG. 3 is an elevation view of the frame as seen in a cross section taken on line III—III in FIG. 2, and FIG. 4 is an elevation view of the mirror as seen in cross section taken on line IV—IV in FIG. 2.

DETAILED DESCRIPTION

A mirror 1 is connected by rods 12 to a frame 6 which is similar to an eyeglass frame. The mirror 1 has an oval or elliptical shape as seen in FIG. 4. The mirror is provided with a holder 2 which can be made of metal, plastic, or other suitable material. There are provided two bearings 3 in the holder 2, in which a roller 4 is carried. The roller 4 is provided with a slot 5 as seen in FIG. 4.

The frame 6, similar to a conventional frame for eyeglasses, comprises two pivotal arms 7 which extend against the side of the head. The frame is additionally provided with a nose support 8 by which it can be seated upon the nose. Above the nose support 8, there are provided two bearings 9 comparable to those at the mirror, and the bearings 9 support a second roller 10. The roller 10 has the same shape as the roller 4. The roller 10 also has a slot 11 as seen in FIG. 3. The frame 6 is curved and forms arc portions 18 which leave the eyebrows of the wearer uncovered. However, the portions 18 also could be straight, but at such a location that the eyebrows are not covered by the frame when the cosmetic mirror is worn.

The rods 12 which connect the mirror 1 and the frame 6, are parallel to one another and are pivotably supported at their ends in the slots 5 and 11 so as to form a parallellogram linkage tiltable in the plane of the rods 12. The rods 12 are composed of two parts 13 and 14 so as to be variable in length. The part 13 includes a sleeve 15 in which the corresponding part 14 is axially displaceable. The distance of the mirror 1 from the frame and, consequently, from the face, can be made larger or smaller by varying the degree of insertion of parts 14 in sleeves 15. There may be provided recesses 16 in the sleeves 15 which engage bosses 17 provided on the parts 14 and thus maintain the axial position of the parts 14 in the sleeves 15.

The cosmetic mirror is worn like spectacles. The arms 7 rest against the head and the nose support 8 is seated upon the nose. The mirror 1 can be moved laterally by pivotal movement of the rods 12 from side to side. The mirror also can be moved upwardly and downwardly, and also turned as a consequence of the swivel support of the rollers 4 and 10 in the bearings 3 and 9. The eyebrows may be clearly viewed in the mirror 1 as a result of the arc portions 18 of the frame 6, so that eyes and eyelashes may easily be viewed in the mirror as needed for cosmetic purposes. The distance of the mirror from the face may be adjusted by telescoping both parts of the rods 12. The bosses 17 engage in the recesses 16 and maintain the adjusted distance. The distance can be varied depending on which bosses are engaged in which recesses.

The bearings 3 and 9 elastically surround and clamp the rollers 4 and 10 respectively. A friction force is established between the bearings 3 and 9 and the rollers 4 and 10 respectively of a magnitude such that the mirror 1 holds its adjusted position in the frame 10. The open construction of the bearing 10 makes possible the removal of roller 4 from the bearing 3 and replacement of the mirror 1 optionally with a planar or a concave mirror.

What is claimed is:

1. A cosmetic mirror comprising an eyeglass-type frame adapted to be worn on the face of a user and including a nose support portion and a pair of lateral arms positionable at the sides of the head of the user; a mirror; and means connected to the frame and mirror for supporting the mirror in adjustably spaced relation in front of the frame, said mirror supporting means comprising first roller means providing pivotal movement of said mirror with respect to said frame in a vertical plane, said first roller means including a bearing on said frame positioned above said nose support portion and a roller frictionally journalled in said bearing, second roller means providing pivotal movement of said mirror with respect to said frame in a vertical plane, said second roller means including a bearing fastened to the upper center edge portion of said mirror, said second roller means including a roller frictionally journalled in said last-mentioned bearing, elongate slots being formed in each of said bearings so as to extend along the longitudinal axes thereof and said slots facing each other in a common plane, a pair of parallel spaced rods extending between said slots, the ends of said rods being pivotably fastened in respectively said first and second rollers so as to facilitate pivotal movement in a plane perpendicular to the axes of rotation of said first and second rollers and provide a parallelogram linkage between said mirror and said frame, the end portions of said rods being in frictional contact with the surfaces of the slots in which said rods are respectively supported.

2. A cosmetic mirror as claimed in claim 1, each of said rods comprising adjustable telescopic first and second portions, said first portion at least partially being formed of a tubular member having a plurality of internal axially spaced recesses, and said second portion being slidably insertable within said tubular member and having a plurality of external axially spaced projections, said projections and said recesses being adapted to selectively interengage to provide predetermined telescoped positioning between said first and second rod portions.

* * * * *